Figure 1:
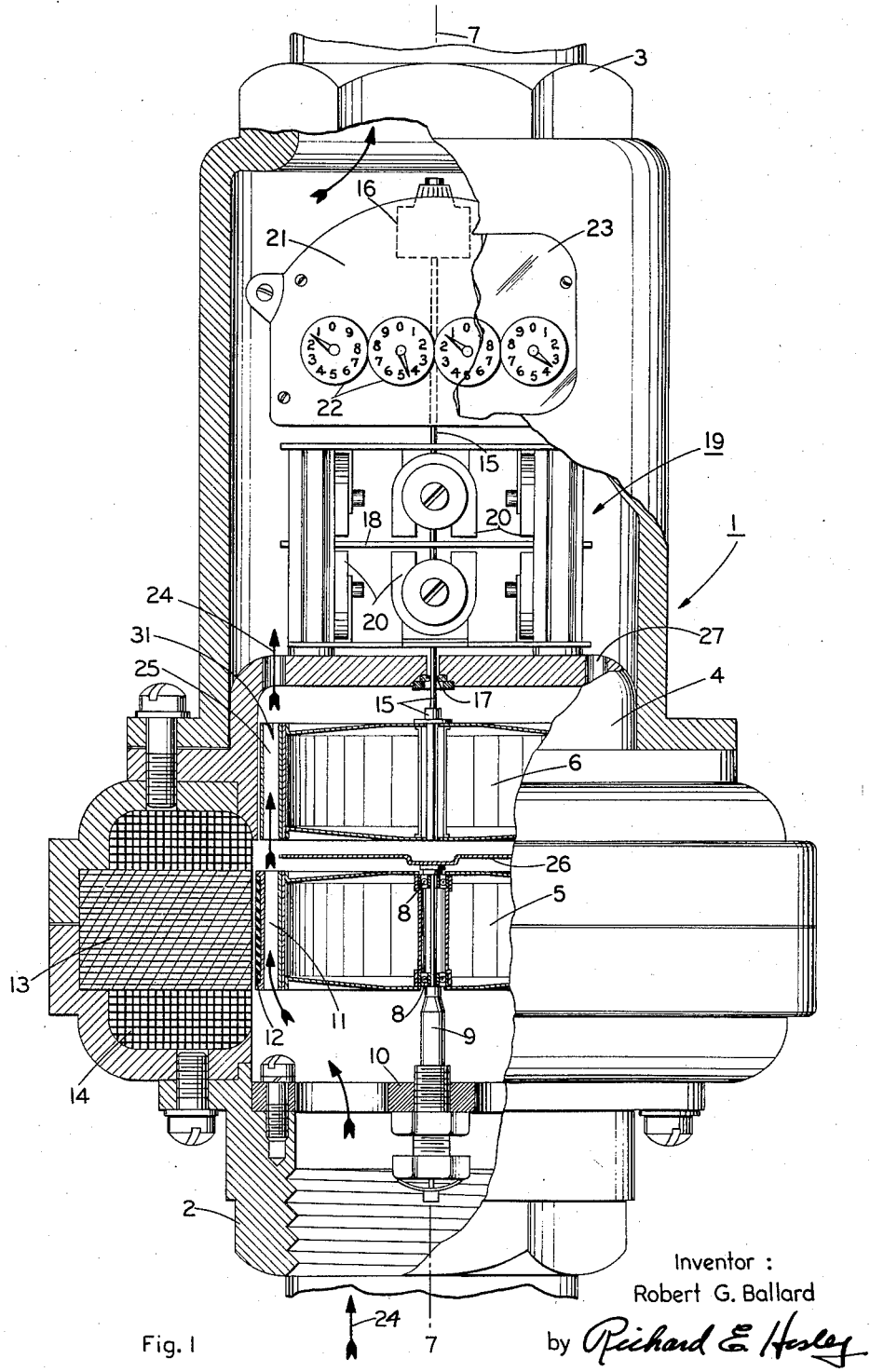

Dec. 1, 1959   R. G. BALLARD   2,914,943
FLOWMETER
Filed May 25, 1956   2 Sheets-Sheet 2
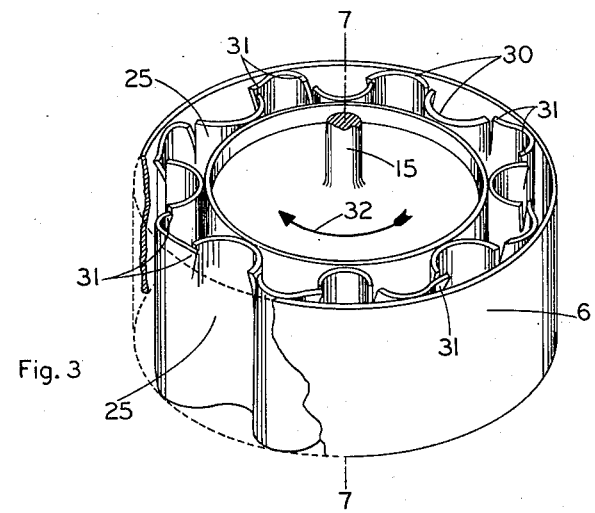
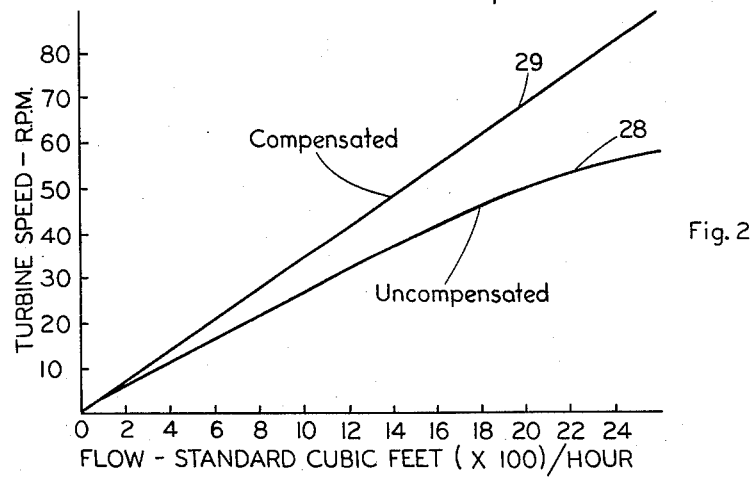
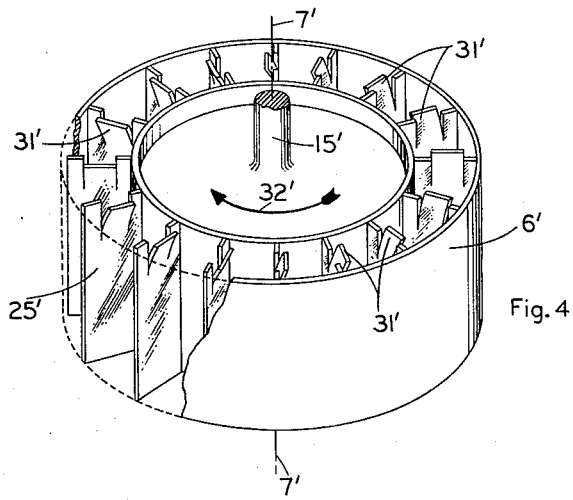
Inventor:
Robert G. Ballard
by Richard E. Hosley
His Attorney United States Patent Office 2,914,943
Patented Dec. 1, 1959

2,914,943

FLOWMETER

Robert G. Ballard, Saugus, Mass., assignor to General Electric Company, a corporation of New York Application May 25, 1956, Serial No. 587,228

3 Claims. (Cl. 73—194)

The present invention relates to flowmeters responsive to mass of fluid flow and, more particularly, to improved integrating mass flowmeters of the impeller-turbine type in which errors due to effects of turbine rotation are avoided.

Measurement of fluid flow in terms of mass, as distinguished from volume, has proved to be most advantageous, especially in the case of fluid fuels, which possess energy contents related to their mass. By way of illustration, it should be observed that the mass of liquid fuel utilized by aircraft engines characterizes fuel heat content, fuel loading of the craft, and expected flight duration, while simple volumetric data concerning the same fuel is of relatively minor value because of wide fluctuations of fuel volume with temperature. In the chemical industries, also, masses of reacting materials may be critical to closely-controlled and efficient reactions. Among the devices which have long been employed in the measurement of mass flow there are, for example, the well known differential-pressure gauges cooperating with Venturi tubes, orifices, Pitot tubes, and nozzles. In addition, weight of fluid flow has been sensed by apparatus which imparts uniform angular velocity to the fluid and involves measurement of either the power expended in accelerating the fluid to that velocity or the momentum lost in a reduction of that angular velocity. One apparatus of the latter type may include a fluid impeller rotated at a constant speed in an upstream relationship to a turbine element wherein the fluid which has been accelerated to a uniform velocity by the impeller is reduced in velocity and dissipates at least part of its angular momentum. These impeller and turbine elements may be in the form of cylinders longitudinally slotted near their peripheries and arranged collinearly within a flow housing, as is disclosed in U.S. Patent 2,714,310 in the name of F. B. Jennings and assigned to the same assignee as that of the present application. In one arrangement, the turbine element may be angularly restrained in relation to its housing by a spring, such that the angular deflections thereof represent mass rate of flow, and in another arrangement the turbine element may be restrained by an eddy-current damping assembly which permits continuous rotation. The latter arrangement enables ready integration of the mass flow information through a counter or register actuated by the turbine.

In one of its applications, the damped rotating-turbine flowmeter last discussed is ideally suited to the indication of integrated mass flow of gaseous fluid flow supplied to consumers by utility companies. However, such gas meters must exhibit great measurement accuracy under widely different flow conditions, and, while such flowmeters can be operated satisfactorily within limited flow ranges, it has been found in practice that intolerable error can occur with flowmeters experiencing both the very high and low flow rates. This result obtains because torque produced on the turbine is proportional to mass rate of flow only when the turbine is not permitted to rotate, and when the turbine rotates rapidly at high flow rates, not all of the fluid angular momentum is removed by the turbine. A plot of turbine speed vs. mass flow rate is thus non-linear, and a counting of the turbine revolutions does not yield an accurate integration of mass flow.

Accordingly, it is one of the objects of the present invention to provide an improved angular-momentum mass flowmeter of the rotating-turbine type wherein effects of turbine rotation do not impair measurement accuracy.

A further object is to provide an integrating angular-momentum mass flowmeter of improved accuracy having a rotating turbine assembly which reacts twice with flowing fluids to achieve proportionality between flow rate and turbine speed.

By way of a summary account of this invention in one of its aspects, I provide a measurement of mass flow in a fluid circuit or path by first imparting a uniform angular momentum to all the fluid under measurement, in a constant-speed impeller, and then reducing the angular momentum of all the fluid in a turbine which rotates against magnetic restraint and turns a counter which indicates total or integrated mass flow. At the downstream end of the turbine there are disposed small vanes which are fixed with the turbine and which are twisted to react with the flowing fluid in a manner to increase the speed of turbine rotation as the flow rate increases. These small vanes are critically disposed and proportioned such that turbine speed is linearly related to mass flow over a wide flow range, and a simple counting of turbine revolutions then yields accurate totalization of mass flows varying over the flow range.

Although the features of this invention which are believed to be novel are set forth in the appended claims, the details and further objects and advantages thereof may be most readily perceived through reference to the following description taken in connection with the accompanying drawings, wherein:

Figure 1 is a partly cross-sectioned side view of an improved mass flowmeter in which my teachings are practiced;

Figure 2 provides plots of flowmeter turbine speeds vs. mass flow rates in compensated and uncompensated constructions;

Figure 3 depicts pictorially a mass flowmeter turbine like that in the apparatus of Figure 1, with one portion cut away to expose structural detail; and Figure 4 presents an alternative turbine in pictorial form, with one outer portion removed to reveal inner construction more fully.

The arrangement for practicing this invention which is illustrated in Figure 1 is particularly advantageous for measurement of gaseous fluid flow, such as the flow of industrial and household gas. The apparatus is generally elongated and possesses circular cross-sections, there being a fluid-flow casing 1 with associated upstream inlet and downstream outlet couplings 2 and 3, respectively. Within the upstream portion 4 of the casing there are disposed a substantially cylindrical fluid impeller 5 and, in collinear downstream relation thereto, a substantially cylindrical fluid turbine 6. Both the turbine and impeller have their longitudinal axes coincident with the longitudinal axis 7—7 of casing 1, and their outer peripheries are closely fitted within but physically spaced from the inner cylindrical surfaces of the casing portion 4. Impeller 5 is rotatable about its longitudinal axis on bearings 8 mounted about a stationary shaft 9 which is fixed with a perforated upstream bracket 10. In this equipment, the light impeller is largely of sheet-metal construction, and in an annular array near its periphery there are numerous longitudinal slots or fluid passages separated by partitions 11. Substantially all of the fluid flow is through these longitudinal fluid passages. Rotation of impeller 5 at a substantially constant speed is occasioned by motor action between the rotor magnetic material 12 on the periphery of impeller 5 and the motor stator including stator laminations 13 and stator field windings 14. Synchronous alternating current motors of this type are well known and are used advantageously in this flowmeter arrangement because the rotor element 12 may be thin, light, and without electrical connections. Excitation for the stator winding may be provided by an A.-C. source having a substantially fixed output frequency.

Fluid leaving the downstream ends of the impeller passages possesses angular momentum related to its mass, and is next directed into the longitudinal peripheral slots or fluid passages in turbine 6. It will be perceived that both the turbine and impeller are of generally the same construction, except that the turbine 6 does not carry a motor rotor element and is angularly movable with a normally-vertical support shaft 15. A permanent-magnet vertical magnetic suspension of known construction is positioned at the location designated by dashed-lines 16 and, together with sensitive low-friction radial bearings such as bearing 17, provides long-wearing and low-torque suspension for shaft 15 and turbine 6. Also affixed to shaft 15 is the conductive eddy-current drag disk 18 of a magnetic damping or restraining assembly 19 which further includes permanent magnets 20. As turbine 6, shaft 15, and disk 18 rotate in a manner described later herein, the restraining assembly 19 imposes counter-torques proportional to their speed, such that the speed of rotation tends to be linearly related to the mass of fluid flow per unit of time. Shaft 15 is geared with the low-torque counting mechanism or register 21, in the manner of a watthour meter, such that the dials 22 provide a display of integrated mass flow data when viewed through the casing window 23.

As indicated by arrows 24, gas entering the lower upstream inlet 2 passes through the openings in bracket 10 and enters the longitudinal peripheral slots of the rotating impeller 5 where it is caused to rotate at a uniform angular velocity. Upon leaving the impeller with a predetermined linear speed, the gas enters the longitudinal peripheral slots in turbine 6, where it impinges upon the slot partitions 25 and releases its angular momentum to the turbine. A viscous decoupling plate 26 mounted on stationary shaft 9 intermediate the impeller and turbine precludes impeller-turbine couplings due to fluid shear effects and small fluid circulation effects. As turbine 6 experiences torques imposed by gaseous flow through it with the aforesaid dissipation of angular momentum, it tends to rotate against the restraining forces exerted between its attached drag disk 18 and the fixedly-positioned magnets 20. This restraint being proportional to speed, it results that the turbine speed tends to be proportional to the amount of fluid angular momentum dissipated and the rate at which it is dissipated. Angular momentum is of course related to the mass of the fluid under measurement, such that the turbine speed is a function of the mass of fluid flow per unit of time. Angular motion of the turbine is registered on dials 22, and the differences between registrations read at different times represents the mass of fluid which has flowed through the casing 1. After passing through the turbine 6, the measured gas flows upwardly through the openings 27 in casing portion 4 and out to consuming apparatus through the outlet coupling 3. Flow disturbance of the operation of the damping mechanism 19 and register 21 may be minimized by placing a glass or windowed cover atop casing portion 4 such that fluid flow from openings 27 is between the inner surfaces of casing 1 and the outer surfaces of the cover. This cover or shroud is not essential in all applications and is not illustrated.

As turbine 6 rotates with increasing speed due to increasing mass rate of fluid flow, less of the angular momentum is removed from the fluid passing through its longitudinal peripheral slots, the fluid and turbine being rotated in the same direction. As a consequence, the turbine does not rotate at as high speeds as it would if all or at least a fixed percentage of the fluid momentum were removed from the fluid under all flow conditions. Because the relationships are non-linear, totalization of the turbine revolutions thus does not accurately represent total mass flow over wide flow ranges. Plot 28 in Figure 2 depicts this non-linear drooping characteristic. Desirably, the relationship between turbine speed in revolutions per minute, the ordinate, and mass of fluid flow, the abscissa, should be linear, as in the case of plot 29. Data for these plots was taken with apparatus similar to that of Figure 1, the abscissa mass flow information being expressed in terms of hundreds of standard cubic feet of air per hour, that is, hundreds of cubic feet of air at a fixed temperature and pressure. It should be borne in mind that the drooping effect in plot 28 results from passage of fluid through the turbine without release of all its angular momentum to the turbine, the percentage of momentum lost in this manner increasing with the turbine speed of rotation. Although this momentum cannot be wholly recovered, it has been found that the turbine speed can nevertheless be raised to values linearly related to mass flow by incorporating a net twisting or skewing in the turbine longitudinal fluid passages. The twisting or skewing is in a direction occasioning torques which accelerate the turbine in the same angular direction that it tends to rotate under influence of the angularly accelerated fluid. In flowing downstream through the turbine passages, the fluid first releases to the turbine as much of its angular momentum as is permitted under the existing condition of turbine rotation and then impinges upon the twisted or skewed portions of the passages where torques proportional to the fluid density and the square of the fluid linear velocity are developed. It is found that the gained turbine torques which are proportional to the square of the fluid velocity vary with the mass flow rate such that they are substantially equal to the turbine torques lost as a result of turbine rotation. Consequently, the compensated turbine speed vs. mass flow rate becomes a linear characteristic, as represented by plot 29.

The turbine depicted in Figure 3 reveals one preferred arrangement for the practice of the aforementioned compensation, this turbine corresponding to that illustrated in the apparatus of Figure 1 and being identified by the same reference characters. It will be observed that the annular space near the turbine periphery is subdivided into a plurality of fluid-conducting passages running longitudinally and parallel to the turbine axis 7—7, by the corrugated sheet-metal partition 30. Near the downstream end of the turbine, that is, the end more removed from the impeller, the partitions 25 are cut and bent into the illustrated relationships. The resulting bent or twisted portions or tabs 31 protrude in directions opposite to the direction of turbine rotation designated by arrow 32, whereby the flowing fluid impinges upon the tabs in a manner to occasion the enhanced turbine speeds.

In Figure 4, another turbine embodiment bearing like reference characters with prime accents includes planar partitions 25' which divide the flow passages. Tabs 31' are all bent in a direction opposite to the direction of turbine rotation and cause the flow passages to be somewhat skewed at their downstream ends. Preferably, the partition material is one which can readily be deformed with a suitable tool such that the tabs may thereby be adjusted to provide the desired compensation effects.

It is not essential that all partitions include the compensating provisions, and the number, size, and shape thereof may be selected according to convenience and compensating torque requirements. As was mentioned earlier, the compensating torques vary not only in accordance with square of the fluid linear velocity through the turbine passages but also in accordance with the fluid density. Quite obviously, variations with fluid density are generally undesirable in a flowmeter which is to be responsive to fluid mass, and even though these variations are small in relation to the effects occasioned by fluid velocity, they should be minimized until of negligible influence upon the meter accuracy. This is accomplished by a suitable proportioning of the turbine damping. In Figure 1, for example, the turbine 6 is angularly damped by the magnetic drag assembly 19, wherein the fixed magnets 20 interact magnetically with the movable conductive eddy-current drag disk 18. Were the damping effects of this assembly only slight, then the turbine 6 would be permitted to rotate rapidly with little restraint and the compensating tabs 31 would necessarily be bent to a considerable extent to introduce the relatively large compensations needed to overcome the pronounced drooping characteristic of the turbine speed vs. mass flow rate response. On the other hand, a much larger damping, which determines that the turbine speeds will always be small in comparison with the impeller speed, results in a less pronounced drooping characteristic of the aforesaid type and less compensation is required. Accordingly, the compensating tabs in the latter case need be bent to a lesser extent to achieve the desired corrections, and with lessened twisting or bending, the response to fluid density becomes more minor. The slower turbine speeds are not disadvantageous because the registering or counting mechanism can be made to expand the indications to any desired degree through simple gearing.

The same principles and constructional features may of course be employed with mass flowmeters of designs other than those specifically illustrated and described.

While particular embodiments of this invention have been shown and described herein, it will occur to those skilled in the art that various changes and modifications can be accomplished without departing either in spirit or scope from the invention as set forth in the appended claims.

What I claim as new and desire to secure by Letters Patent of the United States is:

1. A fluid flowmeter comprising a fluid-tight housing having a substantially cylindrical fluid chamber therein, means for coupling said housing into a fluid flow path, a substantially cylindrical rotatable fluid impeller within and substantially coaxial with said fluid chamber, means rotating said impeller about the longitudinal axis thereof at a substantially constant speed, a substantially cylindrical fluid turbine mounted for rotation about the longitudinal axis thereof and disposed within and substantially coaxial with said chamber in downstream relationship to said impeller, said impeller having a plurality of fluid-conducting passages therethrough which are linear and parallel with the longitudinal axis thereof, said turbine having a plurality of fluid-conducting passages therethrough radially separated by partitions which are parallel with the longitudinal axis of said turbine, the downstream ends of at least some of said partitions being twisted in an angular direction opposite to the direction of turbine rotation, magnetic damping means having a permanent magnet assembly fixed with said housing and a conductive eddy-current drag disk fixed for rotation with said turbine, and a counter mechanism totalizing revolutions of said turbine to characterize mass of fluid flow, said twisted ends of said turbine partitions being disposed to project into the streams of fluid flowing through said passages and thereby to impress compensating torques upon said turbine.

2. A fluid flowmeter comprising a housing having a cylindrical flow chamber adapted to be connected in a fluid flow path, an impeller and a turbine rotatably mounted in said flow chamber in coaxial relationship therewith and with the turbine being located on the downstream side of the impeller, said turbine having linear fluid confining passages parallel to the rotational axis thereof through which fluid rotated by said impeller passes, means rotating said impeller to impart angular momentum to the fluid flowing in said chamber, said turbine tending to remove the angular momentum from the fluid rotated by said impeller whereby a torque variable as a function of mass rate of flow is exerted on said turbine, restraining means permitting rotation of said turbine at a speed less than the impeller speed, a flow indicator connected to be actuated by rotation of said turbine, and compensating means for adding compensating torque to said turbine to compensate for loss of torque due to rotation of said turbine, said compensating means comprising means disposed in at least some of the fluid flow passages in said turbine adjacent the downstream end arranged to deflect fluid flowing through said passages in a direction opposite to the direction of rotation of said turbine.

3. A fluid flowmeter as set forth in claim 2 wherein the fluid flow passages in the turbine are formed in part by partitions at least some of which are bent at the downstream end in a direction opposite to the direction of rotation of the turbine.

References Cited in the file of this patent

UNITED STATES PATENTS

| | | |
|---|---|---|
| 2,602,330 | Kollsman | July 8, 1952 |
| 2,714,310 | Jennings | Aug. 2, 1955 |

OTHER REFERENCES

Introduction to Gas Turbine and Jet-Propulsion Design by Norman and Zimmerman. Published by Harper in 1948. Pages 80–86.

Principles of Aerodynamics by James H. Dwinnell. Published by McGraw-Hill in 1949. Pages 30—35.